United States Patent [19]

McElrath et al.

[11] Patent Number: 4,839,422
[45] Date of Patent: Jun. 13, 1989

[54] TERNARY ADHESIVE COMPOSITIONS

[75] Inventors: Kenneth O. McElrath, Humble, Tex.; Martha L. Robertson, Zachary, La.; Wai Y. Chow, Houston, Tex.

[73] Assignee: Exxon Chemical Patents Inc., Linden, N.J.

[21] Appl. No.: 137,391

[22] Filed: Dec. 23, 1987

[51] Int. Cl.$^4$ .................. C08F 8/32; C08L 51/04; C08L 51/06
[52] U.S. Cl. .................................. 525/74; 525/75; 525/78; 525/194; 525/327.4; 525/329.9
[58] Field of Search .............. 525/74, 78, 194, 75, 525/327.4, 329.9

[56] References Cited

U.S. PATENT DOCUMENTS

| | | | |
|---|---|---|---|
| 3,375,300 | 3/1968 | Rapp | 260/857 |
| 3,765,829 | 10/1973 | Lambert et al. | 8/4 |
| 4,137,185 | 1/1979 | Gardener et al. | 252/33 |
| 4,146,590 | 5/1979 | Yamamoto et al. | 260/878 |
| 4,160,739 | 3/1979 | Stambaugh et al. | 252/34 |
| 4,169,063 | 9/1979 | Kiovsky | 252/51.5 |
| 4,219,432 | 8/1980 | Girgenti et al. | 252/51.5 |
| 4,284,541 | 8/1981 | Takeda | 525/74 |
| 4,320,193 | 3/1982 | Hayashi | 252/51.5 |
| 4,520,171 | 5/1985 | Diveley et al. | 525/279 |
| 4,592,960 | 6/1986 | Inoue | 525/74 |

FOREIGN PATENT DOCUMENTS

| | | | |
|---|---|---|---|
| 1554947 | 6/1976 | United Kingdom | 8/46 |
| 1578049 | 12/1976 | United Kingdom | 8/32 |

*Primary Examiner*—John C. Bleutge
*Assistant Examiner*—David Buttner
*Attorney, Agent, or Firm*—J. F. Hunt; M. B. Kurtzman

[57] ABSTRACT

An adhesive composition which contains a thermoplastic elastomer which includes ethylene propylene rubber, ethylene propylene diene monomer, polyisobutylene butyl rubber, ethylene vinyl acetate graft copolymers thereof with $C_3$ to $C_{10}$ unsaturated mono- and polycarboxylic acids, a tackifying resin and a di- or polyamine cross-linking agent having 2–10 carbon atoms, which is useful as a hot melt or pressure sensitive adhesive having enhanced higher temperature properties.

26 Claims, No Drawings

TERNARY ADHESIVE COMPOSITIONS

BACKGROUND OF THE INVENTION

A class of adhesive compositions known as thermoplastic or hot melt adhesives have enjoyed continually increasing usage in many industrial applications. These adhesives, or hot melts, as they are commonly designated are solid or semi-solid combinations of film-forming resins, tackifying resins, rubbery polymers, plasticizers, waxes and similar materials which are added to the adhesive composition in order to impart various properties thereto.

Adhesive bonds derived from hot melts are particularly useful because (1) they are 100% solid materials and (2) they quickly form tough adhesive bonds simply by cooling—i.e., no need for solvent evaporation, etc.

Adhesives derived from hot melts are particularly useful because of their very rapid set up or bonding time. Strong bonds are formed when the adhesive cools below its melt point and solidifies. There is no long wait for solvent or water evaporation or for chemical curing as with other types of adhesives. Depending on composition, hot melt adhesives can be prepared having good tack, high bond strength, good flexibility, low temperature properties, good environmental resistance, etc.

A typical class of hot melt adhesive composition utilizes polyolefin polymers as the base or carrier material. The polyolefin base is usually blended with other polymers and copolymers, resin tackifiers, and with modifiers and additives. Generally, the polyolefin carrier is polypropylene (either atatic or crystalline or both), EVA, or polyethylene, but that is usually done for cost considerations and it is not necessary that it be so restricted from a technical standpoint.

In spite of the tremendous growth in the use of hot melts and the advantages to be realized by their use, the extent of their utilization has nevertheless been limited by several serious shortcomings. Polyolefin based hot melts, for example, usually suffer from the lack of strong adhesion to nonprous metallic surfces, such as aluminum, steel and the like. They also tend to be quite brittle unless suitably modified. All hot melts generally suffer from low bond strengths at elevated temperatures. When heated, even well below their melt points, they tend to soften and lose strength.

The low temperature brittleness and high temperature softening difficulties of previous hot melts have been approached by changing to epoxy adhesives to which are added elastomers to make rubber toughened epoxies. However, it would be better to achieve similar properties by the addition to cross-linking agents to the relatively less expensive olefin polymers.

Another type of useful adhesive system is the solution based adhesive including pressure sensitive adhesive formulations having multiple uses.

SUMMARY OF THE INVENTION

The present invention provides an adhesive composition having enhanced strength and high temperature resistance, which composition comprises
(a) thermoplastic elastomer preferably selected from ethylene propylene rubber (EPR), ethylene propylene diene monomer rubber (EPDM), polyisobutylene, butyl rubber, ethylene vinyl acetate grafted with $C_3$ to $C_{10}$ unsaturated mono- and polycarboxylic acids, anhydrides such as maleic anhydride, and derivatives thereof;
(b) a trackifying resin selected from petroleum hydrocarbon resins, polyterpene resins, and cyclopentadiene resins; and
(c) a cross-linking agent selected from di- or polyamine hydrocarbyl compounds having from 2 to 20 carbon atoms.

DESCRIPTION OF THE PREFERRED EMBODIMENTS

The term "adhesive" as used herein is in its classical sense a substance which holds materials together because of surface attraction. No one knows exactly what the theoretical base is of adhesiveness. However, all experts will concur that the overriding important characteristic of an adhesive is that the things which are bonded together, i.e., substrates, must be difficult to separate. This probably comes about as a result of intimate contacting.

Thus, when an adhesive is applied to a substance, it must be fluid enough and surface active enough to wet the substrate. Then it must be capable of hardening or setting so that it develops high cohesive strength. Preferably such cohesive strength is that comparable to what would be expected of a moldable, thermoplastic or thermoset material.

Conventional hot melt adhesives are well known and comprise a wide variety of described systems and systems which are actually used in commerce. Very generally, a major component will be a carrier polymer which can be a structurally strong polyolefin such as polyethylene or polypropylene to impart the high cohesive strength when the adhesive sets up after cooling. Other polymers used for their structural properties include nylons, vinyl acetate polymers, polyesters, polycarbonates, PVC, waxes, Saran, and the like. But other components are usually blended in.

Thus, hot melts can have an elastomeric component such as ethylene propylene rubber (EPR), ethylene propylene diene monomer terpolymer (EPDM), polyisobutylenes, (i.e., vistanex, butyl rubber), chlorinated polyethylenes, chlorinated butyl rubbers, and the like.

Generally, elastomers having a relatively low unsaturation or no unsaturation at all such as previously specified are used, since it is desirable to avoid oxidation which occurs with highly unsaturated elastomers.

Furthermore, other polymers which are non-elastomeric can be blended in. They can include block copolymers of ethylene and propylene, random copolymers of ethylene and propylene with each other; and with vinyl allylic monomers such as vinyl acetate, styrene, acrylic acid, acrylates and the like. Thus, a wide variety of olefinic polymers and copolymers will be chosen by the blender in order to achieve the particular goals he has in mind.

In the composition of the invention, graft polymers of prepared by known methods in the art, e.g., those to be found in U.S. Pat. Nos. 3,177,269; 3,177,270; 3,270,090; British Pat. Nos. 1,217,231; 679,562 and the like.

The preferred modifying monomers which are grafted to the backbone of the thermal plastic elastomer are $C_3$ to $C_{10}$ unsaturated mono- and polycarboxylic acids with preferably at least one olefinic unsaturation, anhydrides, salts, esters, ethers, amides, nitriles, thio, glycidyl, cyano, hydroxy, glycol, and other substitute derivatives thereof.

Examples of such acids, anhydrides and derivatives thereof, include maleic acid, fumaric acid, itaconic acid, citronic acid, acrylic acid, glycidyl acrylate, $C_2$ to $C_{10}$ alkyls, cyano-acrylate, hydroxy $C_2$ to $C_{10}$ alkyl methacrylates, acrylic polyethers, acrylic anhydrides, methacrylic acid, crotonic acid, isocrotonic acid, mesaconic acid, angelic acid, maleic anhydride, itaconic anhydride, citraconic anhydride, acrylonitrile, and methacrylonitrile. Metal salts of the acids are useful.

Other monomers which can be used either by themselves or in combination with one or more of the carboxylic acids or derivatives thereof include $C_{10}$ to $C_{20}$ vinyl monomers such as monovinyl aromatic compounds, i.e., styrene, chlorostyrenes, bromostyrenes, alpha methyl styrene and the like.

Other monomers which can be used are $C_{10}$ to $C_{20}$ vinyl esters and ally esters, such as vinyl butyrate, vinyl laurate, vinyl stearate, vinyl adipate and the like. Monomers having two or more vinyl groups, such as divinyl benzene, ethylene dimethacrylate, triallyl phosphite, dialkylcyanurate and triallyl cyanurate.

Nevertheless, the most outstanding results and the highly preferred embodiments of this invention are those in which the graft copolymer meets some highly specific criteria. Primary is the concept that the graft copolymer not only contain grafted active functionality, but that the backbone polymer itself be reduced considerably in melt viscosity, so that it is more compatible with other components of the total adhesive composition and also exerts a much more powerful adhesive influence on the overall composition.

Thus, grafted high melt flow polymers have a double adhesive action. One is obtainable through the wetting activity of the more easily flowable polymer and the other is the chemical attraction of the active groups on the graft copolymer, e.g., carboxylic acid groups, glycidyl groups, etc. This attraction is particularly useful on nonporous surfaces.

The tackifying resins useful in the adhesive compositions of this invention can be a hydrocarbon resin such as ADTAC-B hydrocarbon resin prepared according to the process disclosed in U.S. Pat. No. 3,701,760 as well as other hydrocarbon resins, synthetic polyterpenes, rosin esters and the like. One such suitable tackifying resin is a hydrocarbon resin having a softening point of 100° C. and available commercially as Eastman Resin H-100 from Eastman Chemical Products, Inc. Other hydrocarbon tackifying resins can be prepared by the polymerization of monomers consisting primary of olefins and diolefins and include, for example, the residual by-product monomers resulting from the manufacture of isoprene. These hydrocarbon tackifying resins typically exhibit a Ring and Ball Softening Point of from about 70° to 135° C.; an acid number of from about 0 to 2; a saponification value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the terprene resins such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinoline, limonene, terpentine, a terpene cut or fraction, and various other terpenes. Particularly useful starting materials are terpene mixtures containing at least 20% beta-pinene and/or limonene or dipentene (racemic limonene), and the "sulfate turpentine" obtained as a by-product in the sulfate pulping process.

The aromatic hydrocarbon resins are of intermediate molecular weight, e.g., from about 300 to about 6,000, preferably about 750 to 1,000, and which have a softening point of less than 50° C. and are viscous liquids at room temperature. Suitable commercially available resins include "Piccolastic" A, D and E series, especially the A series resins. One such resin is Piccolastic A-25 which is a polystyrene resin having a softening point of 25° C., a color of 3 (Gardner), an acid number <1 and a specific gravity of 1.05 and a melt viscosity of 100 poise at 47° C.

A preferred group of tackifying resins include the Escorez brand tackifying resins produced by Exxon Chemical Company, Polymers Group. These resins have the advantageous properties shown in Tables 1 and 2 below.

TABLE 1

| ESCOREZ ® 5320 PETROLEUM HYDROCARBON RESIN | | |
|---|---|---|
| Property | | Test Method |
| Softening Point, R & B, °C. | 125 | ASTM E-28 |
| Color | | |
| Saybolt Color, Initial | 30 | ASTM D-156 |
| Gardner Color, After 16 Hours @ 350° F. | 5 | D-1544 |
| Molten Gardner Color | 1 | ASTM D-1544 |
| Cloud Point, °C., 20/40/40[1] | 70 | AMS 360.22 |
| Melt Viscosity, cps | | ASTM D-3236 |
| 300° F. | 22,000[1] | |
| 350° F. | 1,500[1] | |
| 400° F. | 250[1] | |
| Molecular Weight | | GPC[2] |
| $\overline{M}w$ | 460[1] | |
| $\overline{M}n$ | 360[1] | |
| $\overline{M}w/\overline{M}n$ | 1.3[1] | |
| Tg, °C. | 70[1] | DSC[3] |

[1]20% ESCORENE ® UL 7750
40% ESCOREZ 5320
40% Paraffin Wax, 155° F.M.P.
[2]GPC was calibrated with polystyrene standards. Molecular weight is calculated as polyisobutylene equivalents from the following equation:
LOG(PIB$_{mw}$) = 11.1 × Log(PS$_{mw}$) − 0.517.
[3]DuPont - Thermonalysis 9900 Series, Heat Rate 10° C./min.

TABLE 2

| ESCOREZ ® 5380 PETROLEUM HYDROCARBON RESIN | | |
|---|---|---|
| Property | | Test Method |
| Softening Point, R & B, °C. | 85 | ASTM E-28 |
| Color | | |
| Saybolt Color, Initial | 30 | ASTM D-156 |
| Gardner Color, After 16 Hours @ 350° F. | 5 | D-1544 |
| Molten Gardner Color | 1 | ASTM D-1544 |
| Cloud Point, °C., 20/40/40[1] | 70 | AMS 360.22 |
| Melt Viscosity, cps | | ASTM D-3236 |
| 300° F. | 400[1] | |
| 350° F. | 100[1] | |
| 400° F. | 50[1] | |
| Molecular Weight | | GPC[2] |
| $\overline{M}w$ | 420[1] | |
| $\overline{M}n$ | 320[1] | |
| $\overline{M}w/\overline{M}n$ | 1.3[1] | |

TABLE 2-continued

| ESCOREZ ® 5380 PETROLEUM HYDROCARBON RESIN | | |
|---|---|---|
| Property | | Test Method |
| Tg, °C. | 30[1] | DSC[3] |

[1] 20% ESCORENE ® UL 7750
40% ESCOREZ 5380
40% Paraffin Wax, 155° F.M.P.
[2] GPC was calibrated with polystyrene standards. Molecular weight is calculated as polyisobutylene equivalents from the following equation:
LOG(PIB$_{mw}$) = 11.1 × Log(PS$_{mw}$) − 0.517.
[3] DuPont - Thermonalysis 9900 Series. Heat Rate 10° C./min.

The third primary component of the present invention is an amine cross-linking or curing agent. The amine is preferably a diamine or polyamine which binds to the acid or anhydride groups of the graft copolymer adhesive base material. The amine is more preferably a hydrocarbyl polyamine having 2 to 20 carbon atoms in the hydrocarbyl group. Exemplary of such di- and polyamine cross-linking agents are ethylene diamine, diethylene triamine (DETA), triethylene tetramine (TETA), tetramethyl diamine, tetraethylene pentamine, hexamethylene diamine, octamethylene diamine, bis-(p-aminocyclohexyl) methane, dicamethylene diamine, dodecamethylene diamine, octadecamethylene diamine, eicosylene diamine, diethyl toluene diamine, phenylene diamine and the like. The amine curing or cross-linking agent can be employed at from about 0.01 to about 13% by weight of the EP rubber, and more preferably from about 0.1 to about 2% by weight.

The cross-linking agent may be encapsulated as is done for adhesive compositions, so as to break with heat, pressure, shear, sonication, or irradiation.

In addition to the above listed components, it is desirable for the hot melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 330 [tris(di-t-butyl-p-hydroxybenzyl)trimethylbenzene], Dalpac 4C2 [6-di(t-butyl)-p-cresol], Naugawhite (alkylated bis-phenol), Butyl Zimate (zinc dibutyl dithiocarbamate), Ethyl 702 [4,4'-methylene bis(2,6-di-tert-butylpheniol)], Irganox 1010 tetrakis [methylene-3-(3',5'-di-t-butyl-4'-hydroxy-phenyl)propionate]methane, Cyanox 1212 (American Cyanimid) lauryl stearyl thiodipropionate, Irganox 1076 [octadecyl3-(3'-di-tert-butyl-4'-hydroxyphenyl)propionate], Cyanox LTDP (dilauryl 3,3'-thiodipropionate), and the like.

Some preferred compositions of this invention include from about 35 to about 45 weight percent of tackifier resin, from about 15 to about 20 percent by weight of a microcrystalline wax, from about 25 to about 30 percent by weight of at least one normally solid maleic anhydride grafted-ethylene vinyl acetate copolymer and from about 5 to about 20 percent of the normally semi-liquid or liquid maleic anhydride grafted-ethylene vinyl acetate copolymer, preferably about 5 to about 10 percent by weight. The optional antioxidant or stabilizer can be added to the components at about 0.1 to about 1.5 percent and preferably from 0.1 to about 1 percent by weight and typically, 0.5 percent.

An additional and optional component of the present blend formulation is a microcrystalline wax. The microcrystalline waxes of choice are known and conventional. Such waxes are derived from refined fractions of crude oil and therefore consist primarily of paraffinic hydrocarbons which contain significant amounts of branched chain and cycloparaffins as well as aromatics. This composition of components is characterized by exhibiting the formation of only small crystalline regions in the solid wax so that these waxes, as compared to paraffin waxes with fewer branched and cyclic groups, are generally softer and more flexible than an otherwise comparable paraffin wax having a similar melting point or range.

Typically microcrystalline waxes that are suitable for use in formulating hot melt adhesives of the present invention are Shellwax 905 brand supplied by the Shell Chemical Company of 600 Summer Street, Stamford, Conn. 06904; Micro Hex R brand supplied by the Witco Chemical Corporation, Sonneborn Division, 277 Park Avenue, New York, NY 10017; and victory brand Wax supplied by Petrolite Corporation, Bareco Division, 6910 E. 14th Street, Tulsa, Okla. 74112. Other microcrystalline waxes can be selected from other suppliers as long as the selected wax exhibits properties similar to those for Shellwax 905 which are summarized in the following Table 3:

TABLE 3

| PHYSICAL PROPERTIES MICROCRYSTALLINE WAX | | |
|---|---|---|
| Property | ASTM Test Method | Values |
| Melt Point of | D-127 | 174° F. ± 5 (79° C. ± 3) |
| Color, ASTM | D-150 | 1.0–8.0 |
| Flash Point C.O.C., °F. (°C.) | D-92 | 580° F. (304° C.) |
| Penetration, Needle @ 77° F. (25° C.) | D-1321 | 30 ± 6 |
| Oil Content, % Weight | D-74 | 3.0 ± 0.6 |
| Refractive Index @ 100° C. | D-1747 | 1.4420 |
| lbs. per Gal. @ 60° F. (kg/m$^3$) | | 7.51 (899.90) |
| lbs. per Gal. @ 210° F. (kg/m$^3$) | | 6.50 (778.87) |
| Viscosity, Saybolt @ 210° F. (99° C.) | | 100 min. |

Also especially suitable for the invention is Exxon Chemical Company's Escomer ® H-101 which has the typical properties given in Table 4 below.

TABLE 4

| ESCOMER ® H-101 | |
|---|---|
| Typical Properties | |
| Brookfield Viscosity (@ 121° C.) Cps | 27 |
| Softening Pint (Ring & Ball) °C. | 112 |
| Viscat Softening Point °C. | 68 |
| Needle Penetration (1/10 mm) | |
| 25° C. | 3 |
| 60° C. | 6 |
| Congealing Point, °C. | 101 |
| Volatility, wt. % loss 10 gms/175° C./5 hrs. | 3.0 |
| Whiteness Index | 55.5 |
| Peak Melt Point (DSC) °C. | 111 |
| Peak Crystallization Point (DSC) °C. | 96.0 |
| Density (g/ml) 25° C. | 0.95 |

Moor and Munger's Paraflint H-1 (Sasol) was has similar properties.

Although several brands of microcrystalline waxes are provided, it should be understood that such waxes are well known in the art and are readily available commercially.

Other optional but suitable components for the formulations of the invention are refined hydrocarbon oils such as are commonly used in adhesives including paraffinic, aromatic, and naphthenic oils such as Witco's Kaydol and Arco's Tufflo naphthenic oil.

Also useable as optional components are alcohols such as methanol, ethanol, etc. up to long chain waxy alcohols.

The refined oils serve to reduce viscosity and improve surface tack properties such as rolling ball tack. The alcohols prevent physical associations resulting in gels in solvent-based adhesive formulations. In hot melt adhesives the alcohols delay cross-linking thereby providing control such as increased pot-life.

The hot melt adhesive compositions of this invention are prepared by blending together the components in the melt at a temperature of about 325°–375° F. (160° to about 200° C.) until a homogeneous blend is obtained. The blending takes about 1 hour. Various methods of bending materials of this type are known to the art and any method that produces a homogenous blend is satisfactory. These components blend easily in the melt and a heated vessel equipped with a stirrer is all that is required. For example, a cowl's stirrer provides an effective mixing means for preparing these hot melt adhesive compositions. The components are added in no particular order. However, generally, the tackifying resin is added first and heated in the vessel until molten. Thereafter the maleated ethylene propylene rubber copolymer or, alternatively, the rubber and resin are placed in the vessel together (to keep a reduced viscosity) and the heating and mixing is begun. Then the microcrystalline wax is added. In general the curing or cross-linking agent is added to the mixture last and preferably just before use. e.g., by spraying the amine onto a pressed-out sheet of adhesive or onto the substrates to be bonded and the blend is cured at a suitable temperature for a sufficient time to provide good adhesion.

In a solvent based formulation, the tackifying resin, maleated ethylene-propylene rubber copolymer, oil and crosslinking agent can be dissolved in a suitable solvent such as toluene. Alcohols such as methanol are added to prevent gel formation.

The present invention can be more easily illustrated by reference to the following non-limiting examples.

EXAMPLE 1

Maleated ethylene propylene rubber was blended with a tackifying resin and wax in proportions typical of standard hot melt adhesives, as shown in Table 1. The blending was done in a laboratory blender at 190° C. for 70 minutes. The viscosity of the resultant blend is also shown in Table 5. The blend was drawn down with an eight path applicator into thin sheets and diethylene triamine (DETA) was sprayed on the sheets. The sprayed sheets were then sandwiched between aluminum strips and cured by heating in an impulse sealer at 175° C. and 20 psig for 15 seconds. The amount of DETA cross-linking agent employed and the adhesion test results are shown in Table 6 below.

TABLE 5

FORMULATION AND VISCOSITY OF REACTIVE HOT MELT ADHESIVES

| Blend Formulation | wt. % |
| --- | --- |
| Maleated EP rubber | 30 |
| Escorez 5320 | 45 |
| Paraflint H-1 Wax | 25 |
| Irganox 1010 Stabilizer | 0.5 |
| Brookfield Viscosity | (cps) |
| At 160° C. | 196,750 |
| At 200° C. | 69,600 |

TABLE 6

PERFORMANCE PROPERTIES OF REACTIVE HOT MELT ADHESIVES

| Peel Strength to Aluminum | (lbs/in) |
| --- | --- |
| No amine | 3.6 |
| 5.7% DETA | 3.8 |
| 11.2% DETA | 5.8 |
| 12.5% DETA | 6.3 |
| SAFT to Aluminum | (°F.) |
| No amine | 206 |
| 1.88% DETA | 225 |
| 2.33% DETA | 228 |
| 4.98% DETA | 246 |
| Tensile Strength | (psi) |
| No amine | 105.3 |
| 3% DETA | 548.15 |

SHEAR ADHESION FAILURE TEMPERATURE

Equipment and Materials

Impulse heat sealer
1"×4" strips of substrate
Razor blade knife
1" bar
Mechanical convection oven (80°–250° C.)
Gardner knife
Micrometer
Solvent removal oven
4.5 lb. rubber roller
Hole punch

Sampler Preparation

1. Samples prepared as hot melt adhesives are melted and drawn down into a 5 mil film using an 8 path applicator.

2. Samples which have been solution blended are drawn down on the appropriate backing with a Gardner knife and dried in a solvent removal oven. Typically the dry coating thickness will be 1–5 mils. Coating thickness is measured with a micrometer.

Test Conditions

Sealing temperature range: 120°–180° C.
Sealing pressure range: 15–40 psig
Sealing time: 0.5–15 seconds
Oven temperature ramp rate: 10° C./15 minutes

Procedure

1. Hot Melt Blended Samples Place a 1"×1" sample of adhesive between the ends of two 1"×4" strips of substrate in a Lap Shear configuration. Place this sample between two pieces of release paper and heat seal at the appropriate conditions.

2. Solution Cast Samples

Cut 1"×4" strips from the film coated on the backing. Overlap the ends of these strips 1" in a Lap Shear configuration. Either heat seal this sample in an impulse heat sealer at the appropriate conditions or laminate the bond with a 4.5 lb. rubber roller (2 passes).

3. Prepare 4 replicates of each sample to be tested. Hang each sample in the oven so that the samples hang vertically. Punch a hole in the lower end of each sample and attach a 500 gram or 1000 gram weight.

4. Begin testing with the oven temperature at 80° C. and stairstep the temperature up 10° C. every 15 minutes to a maximum temperature of 250° C.

5. Record the temperature at which the bond fails and the weight falls.

Reporting Data

1. Report average failure temperature of the 4 replicates of each sample.

2. Report the sealing conditions used to prepare each sample.

As indicated from Table 6 above, the peel strength and Shear Adhesion Failure Temperature (SAFT) were good to excellent. Normally, hot melt adhesives have SAFT values which are typically about 150° F. (66° C.). Therefore, the present SAFT results, all being above 150° F. (66° C.), exceed the typical values, and all the results with DETA are above the 206° F. (96.6° C.) SAFT value of the hot melt adhesive without DETA. The tensile strength results were run after curing at 175° C. for 15 minutes and show a surprising increase in tensile strength over the adhesive formulation without DETA.

EXAMPLE 2

A typical pressure sensitive adhesive formulation according to Table 7 was prepared using maleated ethylene propylene rubber blended with a tackifying resin, an oil and diethylenetriamine cross-linking agent. The blends, 15 wt.% total solids concentration, were solution blended in xylene/methanol solvent. A film was drawn down on an aluminum sheet and the solvent flashed off at 100° C. for 10 minutes to yield a dry coating thickness of 3 mils. The results of testing the pressure sensitive formulations are also given in Table 7.

TABLE 7

FORMULATION AND PROPERTIES OF REACTIVE PRESSURE SENSITIVE ADHESIVES

| Blend Formulation | wt. % | | |
|---|---|---|---|
| Maleated EP rubber | 40 | 39 | 31 |
| Escorez 5320 | 60 | 59 | 47 |
| Kaydol Napthenic Oil | — | — | 20 |
| Diethylenetriamine | — | 2 | 2 |
| Modified SAFT Result[1] | (°C.) | | |
| 3 Replicate Samples | 90 | 210 | 110 |
| | 100 | 210 | 110 |

TABLE 7-continued

FORMULATION AND PROPERTIES OF REACTIVE PRESSURE SENSITIVE ADHESIVES

| | 100 | 210 | 120 |
|---|---|---|---|
| Peel Strength to Aluminum | | lbs/in | |
| Heat Seal Time at 175° C.; 3 seconds | 19.5 | 11.5 | 7.2 |
| | 19.5 | 10.5 | 6.4 |
| 30 seconds | 22.5 | 18.5 | 11.8 |
| | 21.0 | 16.3 | 10.6 |

[1]1" × 1" overlap, 500 g weight, heat sealed at 175° C. for 30 seconds, oven stairstepped at 10° C. increments every 15 minutes starting at 80° C.

EXAMPLE 3

The proportion of ethylene in the maleated ethylene propylene rubber was varied to determine the effect on adhesive properties. Formulations were prepared both without diethylene triamine (DETA) and with 2 parts of DETA, the remaining components included 60 parts E-5320 resin and 40 parts maleated ethylene propylene rubber (in which the proportion of ethylene to propylene is varied from 43 to 77%). The adhesive was made by mixing the components in a xylene/methanol solution and casting the solution as a film onto aluminum sheets. Coating thickness after solvent evaporation was 5 mils. The sheet was cut into strips and heat sealed for 30 seconds at 175° C. to cure and bond the adhesive. The strips were then subjected to SAFT and peel strength tests with the results shown in Table 8 below.

TABLE 8

HIGH TEMPERATURE ADHESIVES EVALUATION

| | 3-1 (43% Ethylene) | | 3-2 (67% Ethylene) | | 3-3 (77% Ethylene) | |
|---|---|---|---|---|---|---|
| EP Rubber Sample | w/o DETA[3] | w/DETA | w/o DETA[3] | w/DETA | w/o DETA[3] | w/DETA |
| Modifier Shear Adhesion Fail Temperature, °C. (1) (3 replications) | 120 | 220 | 130 | >250 | 150 | 250 |
| | 120 | >250 | 130 | >250 | 150 | >250 |
| | 120 | >250 | 130 | >250 | 150 | >250 |
| Peel Strength To Aluminum (2) | 22.0 | 19.0 C/A | 16.3 12.0 C/A | 2.3 A | 4.8 C/A | |
| | 20.5 C | 11.5 C/A | 17.8 C/A | 11.5 C/A | 2.2 A | 5.3 C/A |
| | | 11.3 C/A | 15.5 C/A | 10.5 C/A | 2.0 A | 6.3 C/A |
| | | | | | 4.4 C | |
| (Average) | 21.3 C | 13.9 C/A | 16.5 C/A | 11.3 C/A | 5.1 C | 5.5 C/A |
| | | | | | 2.2 A | |

(1) 1" × 1" overlap, 500 g. weight, temperature raised 10° every 15 minutes
(2) C + cohesive failure, A + adhesive failure (visual observation)
(3) DETA + diethylenetriamine, w/o - without, w/ = with As seen in Table 8, one concludes that in the absence of DETA, and SAFT increases with increasing ethylene content about 30° C., from 120° to 150° C. Surprisingly, with the DETA or other cross-linking system, SAFT values of greater than 250° C. are achievable. However, as the ethylene content increases the peel strength decreases. Further, the failure mode is usually a cohesive failure for uncured systems, but a mixed cohesive/adhesive failure for cured systems. It should be noted that while peel strengths of the cured systems decrease compared to the uncured systems, except for the highest ethylene content (run 3-3); nevertheless, cured peel strengths are quite reasonable.

In the following example, a lower softening point resin and the effect of adding an oil to lower the blend viscosity was investigated.

EXAMPLE 4

A blend of maleated ethylene propylene rubber with a tackifying resin and either with or without a curing or cross-linking agent was prepared as indicated in Example 2 except that the tackifying resin had a lower softening point. For comparison examples of this invention with a tackifying resin of a higher softening point, e.g., such as in Example 2, are included. The formulation data and test results from SAFT and peel strength test are summarized in Table 9 below. Also included in the adhesive formulations are added oils to reduce blend viscosity.

TABLE 9

COMPARISON OF HIGH TEMPERATURE ADHESIVE FORMULATIONS CONTAINING VARYING SOFTENING POINT TACKIFYING RESINS

| Run | 1 | 2 | 3 | 4 | 5 | 6 |
|---|---|---|---|---|---|---|
| Maleated EP Rubber | 40 | 40 | 40 | 40 | 36 | 36 |
| Escorez 5320 | 60 | 60 | — | — | — | — |
| Escorez 5380 | — | — | 60 | 60 | 54 | 54 |
| DETA (1) | — | 2 | — | 2 | — | 2 |
| Kaydol | — | — | — | — | 10 | 10 |
| Brookfield Viscosity @ 200° C. (cps) | | | | | 345000 | |
| SAFT (deg. C.) - heat sealed (2) | 110 | 170 | 160 | 150 | 100 | 140 |
| | 110 | 200+ | 170 | 200+ | 100 | 140 |
| | 110 | 200+ | 170 | 200+ | 100 | 160 |
| SAFT (deg. C) - laminated (3) | | 110 | | 140 | | 110 |
| | | 110 | | 140 | | 120 |
| | | 130 | | 140 | | 120 |
| | | 130 | | 140 | | 120 |
| | | 130 | | 140 | | 120 |
| | | 140 | | 130 | | 120 |
| Peel Strength (lbs./in) (4) | | | | | | |
| Aluminum | 17.75 | 9.5 | 6.24 | 5.5 | 7.5 | 4.3 |
| | 10.5 | 9 | 7.25 | 6 | 6.8 | 5.3 |
| | 16.5 | 10 | 7.25 | 8 | 8.3 | 4.5 |
| Mode of Failure | Adh. | Adh. | Adh. | Adh. | Alt. Adh. | Adh. |
| Polypropylene | 12.2 | 12.2 | 10.7 | 21.5 | 10.0 (adh) | SF |
| | 10.1 | 11.8 | SF | 21.5 | 17.0 (coh) | SF |
| | 8.8 | 15.4 | SF | 20.75 | 18.0 (coh) | SF |
| Mode of Failure | Adh. | Coh. | Adh. | Coh. | | |

(1) Wt. % based on rubber only
(2) 1" × 1" × 500 g.; 6 mil double-faced adhesive film heat sealed to aluminum Sealing conditions:175° C./30 seconds/20 lbs. Oven ramped 10° C./15 minutes
(3) 1" × 1" × 500 g.; 6 mil double-faced adhesive film laminated with 4.5 lb. roller Oven ramped 10° C./15 minutes
(4) Heat sealed 175° C./15 seconds/20 lbs.

The foregoing data show that the lower softening point resin improved the SAFT values in the uncured system. The conditions of the SAFT test are not sufficient to cure the adhesive containing the amine cross-linking agent adequately. Thus, performance was not as satisfactory for the laminated samples as for the heat sealed samples. In addition to metal, the formulations adequately bond to propylene. The addition of a viscosity reducing oil (Runs 5 and 6) decreased performance results.

In an effort to reduce viscosity and provide formulations having lower melt viscosity for better flow properties and still maintain good adhesion, a lower viscosity polymer was used in formulations for which the properties of the final adhesive were determined.

EXAMPLE 6

A maleated ethylene vinyl acetate copolymer was blended with a tackifying resin and an amine cross-linking agent which was triethylene tetramine (TETA) in the weight proportions shown below. The melt viscosity at 160° C. was checked before adding the amine cross-linking agent.

TABLE 10

| Run | 1 | 2 | 3 |
|---|---|---|---|
| Maleated-ethylene vinyl acetate copolymer | 60 | 75 | 75 |
| Escorez resin E-5380 | 40 | 25 | — |
| Escorez resin ECR 356 | — | — | 25 |
| TETA | 0.3 | 0.375 | 0.375 |
| SAFT (°C.) | 110 | 120–145 | >250 |
| Viscosity @ 160° C. before amine, cps | 30,000 | 41,000 | 240,000 |

EXAMPLE 7

Several blend formulations containing a low and high molecular weight maleated ethylene propylene rubber were prepared, containing a low softening point tackifying resin and an amine cross-linking agent, such as triethylene tetraamine (TETA). The formulations were also tested without amine cross-linking agent. All formulations were measured for viscosity, without the amine. The results of the SAFT are given below with component weights in the formulations. All formulations were heat cured at 175° C. for 30 seconds.

TABLE 11

| Run | 1 | 2 | 3 |
|---|---|---|---|
| Low Mol. Wt. Maleated EP* Rubber | 35 | 30 | 25 |
| High Mol. Wt. Maleated EP* Rubber | 5 | 10 | 15 |
| E-5380 Resin | 60 | 60 | 60 |
| TETA | 0.2 | 0.2 | 0.2 |
| SAFT (°C.) | 218 | 212 | >250 |
| Viscosity @ 160° C., cps | 27,500 | 45,000 | 129,000 |

TABLE 11-continued

| Run | 1 | 2 | 3 |
|---|---|---|---|
| @ 180° C., cps | | | 69,000 |

*EP = Ethylene/Propylene

All formulations without amine failed at SAFT conditions less than 85° C.

The bonding of aluminum/nylon and aluminum-/aluminum films using an adhesive of this invention is illustrated in the following example.

EXAMPLE 8

Several blend formulations were prepared and tested for peel strength in bonding films of aluminum-/aluminum and aluminum/nylon to make laminated films. Two formulations of the present invention were prepared and compared with a known polyurethane/-diisocyanate two-part adhesive, currently in use for film applications. The blend formulations and results of the test are given in Table 12 below.

TABLE 12

| Run | 1 | 2 | 3 |
|---|---|---|---|
| Blend Composition | | | |
| High Mol. Wt. Maleated EP*, wt. % | 15 | 15 | — |
| Low Mol. Wt. Maleated EP*, wt. % | 25 | 25 | — |
| Escorez E-5380, wt. % | 60 | 60 | — |
| TETA wt. % (based on rubber weight only) | — | 0.5 | — |
| Adcote 506-40 polyurethane diisocyanate system, wt. % | — | — | 100 |
| Peel Strength | | | |
| Aluminum/aluminum[1] | 3.98 | 4.6 | 4.5 |
| Aluminum/nylon[1] | 3.78[2] | 3.92[3] | 3.35 |

*Ethylene Propylene Rubber
[1]Sample 1" × 3" heat sealed at 300° F./20 lbs. pressure for 15 seconds; Instron crosshead speed set at 2"/min.
[2]Cohesive failure
[3]Adhesive failure at Al/adhesive interface The data show that formulations of this invention are as good as the currently used adhesive. Additionally, when placed in an autoclave at 260° F. under water, test strips of Run 2 showed no delamination compared with test strips of the polyurethane/diisocyanate system which showed substantial delamination.

Several additional laminations were carried out using maleated EP copolymer with Escorez 5000 based adhesives. Two 25 gallon batches were prepared, the first contained 11 weight percent solids of Escorez E-5380 with maleated EP and the second contained Escorez E-5320 with maleated EP. The adhesives were toll laminated under varying conditions to bond nylon and aluminum films. Variable conditions during the several laminations included adhesive batch, presence or absence of amine cross-linking agents, lamination line speed and adhesive coating weight. Tests of laminated films immersed in pressurized water at 260° F. for 1 hour in an autoclave revealed no delamination. However, some samples from the E-5380 resin batch formed channels between the layers where water apparently had permeated between the nylon and aluminum from the edge. The best performance on water immersion was obtained from use of the E-5320 resin, about 0.1 weight percent based on the polymer of triethylene tetramine and a high coating weight. Such laminated films having nylon/aluminum/polyolefin layers are useful for making retortable food pouches.

EXAMPLE 9

A maleated ethylene propylene rubber having a MFR of 20 was blended with tackifying resin and an amine cross-linking agent as shown for 2 below. Sample 1 without the amine is for comparison.

TABLE 13

| EVALUATION OF 20 MFR MALEATED EP RUBBER | | |
|---|---|---|
| | 1 | 2 |
| 20 MFR Maleated EP Rubber | 40 | 40 |
| Escorez 5380 Tackifier | 60 | 60 |
| DETA | — | 0.5 |
| Brookfield Viscosity, cps | | |
| 160° C. | 280,000 | |
| 180° C. | 171,500 | |
| 200° C. | 75,750 | |
| Modified SAFT, °C. Al/Al; 5 mil adhesive laminated with 4.5 lb. roller 1" × 1" × 500 g. | 80 | 80 (1) |
| Modified SAFT, °C. Al/Al; 5 mil adhesive heat sealed @ 350° F./15 seconds/15 lbs 1" × 1" × 500 g. | 99 99 99 | >250 >250 >250 |
| 180° Peel, lbs/in Mylar Backing | 2.8 2.5 3 | 3.2 3.35 3.7 |
| Average | 2.8 | 3.4 |
| Polyken Tack, gms. Mylar Backing | 165 116 105 137 | 151 168 228 192 |
| Average | 131 | 185 |

(1) Temperature at which test is begun

Sample 2 is pumpable in some hot melt adhesive equipment and has a measurable polyken tack at room temperature.

EXAMPLE 10

The following example demonstrates adhesive formulations with other tackifier resins including the superior-performing ECR-111 hydrogenated piperylene/amylene tackifier resin and two liquid tackifier resins. The formulations and measured properties are shown below. Also shown are formulations without an amine of the invention.

TABLE 14

| | | | | | | | |
|---|---|---|---|---|---|---|---|
| 20 MFR Maleated EP | 40 | 40 | 40 | 40 | 40 | 40 | 22.5 |
| ECR-327 (870130) | 60 | 60 | — | — | — | — | — |
| ECR-143H | — | — | 60 | 60 | — | — | — |
| ECR-111 (394-76) | — | — | — | — | 60 | 60 | 55 |
| TETA (1) | — | 0.25 | — | 0.25 | — | 0.25 | — |
| Kaydol Oil | — | — | — | — | — | — | 22.5 |
| Viscosity, cps | | | | | | | |
| 160° C. | 253,000 | | 199,000 | | 190,000 | | 9,700 |
| 180° C. | 122,500 | | 102,500 | | 89,000 | | 4,700 |
| Rolling Ball Tack (cm) | 5.5 | 7.3 | 4 | 3.75 | 10.8 | 8.8 | 2.2 |
| 90° Quick Stick (lbs/in) | 0.27 | 0.18 | 0.33 | 0.22 | 2.1 | 2.65 | |
| 180° Peel to SS | 0.23 | 0.13 | 0.53 | 0.33 | 3.1 | 6.7 | 2.6 |

TABLE 14-continued

| (lbs/in) | | | | | | (AT) | (AT) |
|---|---|---|---|---|---|---|---|
| Polyken Tack, gms | 331 | 358 | 475 | 431 | 709.5 | 841.75 | 1412 |
| SAFT (2), °F. | 155 | 219 | 151 | 200 | 161 | 270.5 | 117 |
| °C. | 68.3 | 103.9 | 66.1 | 93.3 | 71.7 | 132.5 | 47 |
| Modified SAFT (3), (°C.) | 250+ | | 250+ | | | 250+ | |

(1) Triethylenetetramine; weight percent based on rubber weight only
(2) 1" × 1" × 1000 g./laminated with 4.5 lb. roller 10° F./15 min temperature ramp no pre-curing
(3) Alum./alum. bond, 1" × 1" × 500 g., heat sealed at 175° F./15 sec./20 lbs 10° C./15 min temperature ramp; held at 250° C. for 1 hour.
(AT) — adhesive transfer From the foregoing description, the present invention contemplates as a preferred cross-linking agent triethylene tetramine, diethylene triamine, tetraethylene pentamines, and diethyl toluene diamine. Furthermore, the preferred amount of the cross-linking agent is from about 0.01 to about 15 percent by weight of the rubber, with from about 0.05 to about 2 percent by weight being preferred, and from about 0.1 to about 1 percent by weight being more preferred. As a result, a preferred composition of this invention is an adhesive composition in which the thermoplastic elastomer is present at about 20 to 60 percent by weight, the tackifying resin is present at about 30 to about 70 percent by weight and the cross-linking agent is present at about 0.05 to about 2 percent by weight.

For formulations with cyclopentadiene resins or hydrogenated cyclopentadiene resins such as Escorez 5320 or Escorez 5380, some preferred compositions include: (a) 20–50 weight percent maleated EP rubber, 30–60 weight percent cyclopentadiene-based tackifier, and 1–15 weight percent ethylene diamine; and (b) 30–6 weight percent maleated EP rubber, 50–70 weight percent hydrogenated cyclopentadiene, and 0.5–5 weight percent ethylene diamine.

Having described the invention, skilled artisans can readily envision various alternatives and changes which are within the spirit and scope of the present invention. Therefore, it is desired that the present invention be limited only by the lawful scope of the following claims.

We claim:

1. An adhesive composition having enhanced strength and high temperature resistance, comprising:
   (a) a thermoplastic elastomer having grafted thereto a $C_3$ to $C_{10}$ unsaturated mono- or polycarboxylic acid, anhydride and derivatives thereof.
   (b) A tackifying resin selected from petroleum hydrocarbon resins, polyterpene resins, and cyclopentadiene resins; and
   (c) a cross-linking agent selected from di- or polyamine hydrocarbyl compounds having from 2 to about 20 carbon atoms.

2. The composition of claim 1 wherein said cross-linking agent is selected from ethylene, propylene, benzene, toluene and tallow-based di- and polyamine hydrocarbyl compounds.

3. The composition of claim 1 wherein said cross-linking agent is selected from diethylene triamine, triethylene tetramine, tetraethylene pentamine, ethylene diamine, and diethyl toluene diamine.

4. The composition of claim 1 wherein said cross-linking agent is ethylene diamine.

5. The composition of claim 1 wherein said thermoplastic elastomer is selected from ethylene propylene rubber, ethylene propylene diene monomer rubber, polyisobutylene, butyl rubber, ethylene vinyl acetate, ethylene (meth) acrylic acid copolymer.

6. The composition of claim 1 wherein said cross-linking agent is present in said composition from about 0.01 to about 15.0% by weight of said thermoplastic elastomer.

7. The composition of claim 6 wherein said cross-linking agent is present from about 0.05 to about 2% by weight of said thermoplastic elastomer.

8. The composition of claim 1 wherein said tackifying resin is a cyclopentadiene resin.

9. The composition of claim 1 wherein said thermoplastic elastomer is a graft copolymer of ethylene propylene rubber with a $C_3$ to $C_{10}$ unsaturated mono- or polycarboxylic acid anhydride or derivative.

10. The composition of claim 9 wherein said graft copolymer is a graft copolymer having an unsaturated mono- or polycarboxylic acid selected from maleic acid, fumaric acid, acrylic acid, hydroxy-$C_2$ to $C_{20}$ alkyl methacrylates, and anhydrides and derivatives thereof.

11. The composition of claim 10 wherein said graft copolymer is grafted with maleic acid anhydride.

12. The composition of claim 1 comprising about 20 to about 60% by weight of said thermoplastic elastomer, from about 30 to about 70% by weight of said tackifying resin, and from about 0.01 to about 2% by weight of said cross-linking agent.

13. The composition of claim 12 wherein said cross-linking agent is ethylene diamine.

14. The composition of claim 12 wherein said cross-linking agent is selected from tetraethylene pentamine, triethylene tetraamine, or diethylene triamine.

15. The composition of claim 1 wherein there is additionally provided an antioxidant.

16. The composition of claim 15 wherein said antioxidant is present at from about 0.01 to about 1 percent by weight.

17. The composition of claim 1 further comprising a modifying wax.

18. The composition of claim 17 wherein said modifying wax is a microcrystalline wax.

19. The composition of claim 18 wherein said microcrystalline wax is present at from about 10 to about 30 percent by weight.

20. The composition of claim 1 further comprising an oil component.

21. The composition of claim 1 wherein said thermoplastic elastomer is a maleated ethylene propylene rubber copolymer which is present at 20 to about 50 percent by weight, said tackifying resin is a cyclopentadiene resin which is present at 30 to 60 percent by weight, said cross-linking agent is ethylene diamine which is present at from 1 to 15 percent by weight, said composition further comprising a microcrystalline wax which is present at 20 to 30 percent by weight and an antioxidant which is present at from 0.1 to 1 percent by weight.

22. The composition of claim 18 having a Brookfield viscosity at 160° C. in the range of about 150,000 to about 250,000 centipoise.

23. The composition of claim 12 wherein said adhesive functions as a pressure sensitive adhesive and said thermoplastic elastomer is a maleated ethylene propylene rubber elastomer which is present at from 30 to 60 percent by weight, said tackifying resin is a hydrogenated cyclopentadiene-resin which is present at from about 50 to about 70 percent by weight, and said crosslinking agent is ethylene diamine which is present at from about 0.5 to about 5 percent by weight.

24. The composition of claim 1 wherein said crosslinking agent is encapsulated.

25. The composition of claim 1 further comprising an alcohol.

26. The composition of claim 1 wherein said tackifying resin is hydrogenated.

* * * * *